W. F. SCHALLER.
DOUGHNUT FORMING AND COOKING MACHINE.
APPLICATION FILED APR. 20, 1920.

1,391,212.

Patented Sept. 20, 1921.
4 SHEETS—SHEET 1.

INVENTOR.
W. F. Schaller.
BY
Carlos P. Griffin
ATTORNEY.

W. F. SCHALLER.
DOUGHNUT FORMING AND COOKING MACHINE.
APPLICATION FILED APR. 20, 1920.

1,391,212.

Patented Sept. 20, 1921.
4 SHEETS—SHEET 2.

INVENTOR.
W. F. Schaller.
BY
Carlos P. Griffin
ATTORNEY.

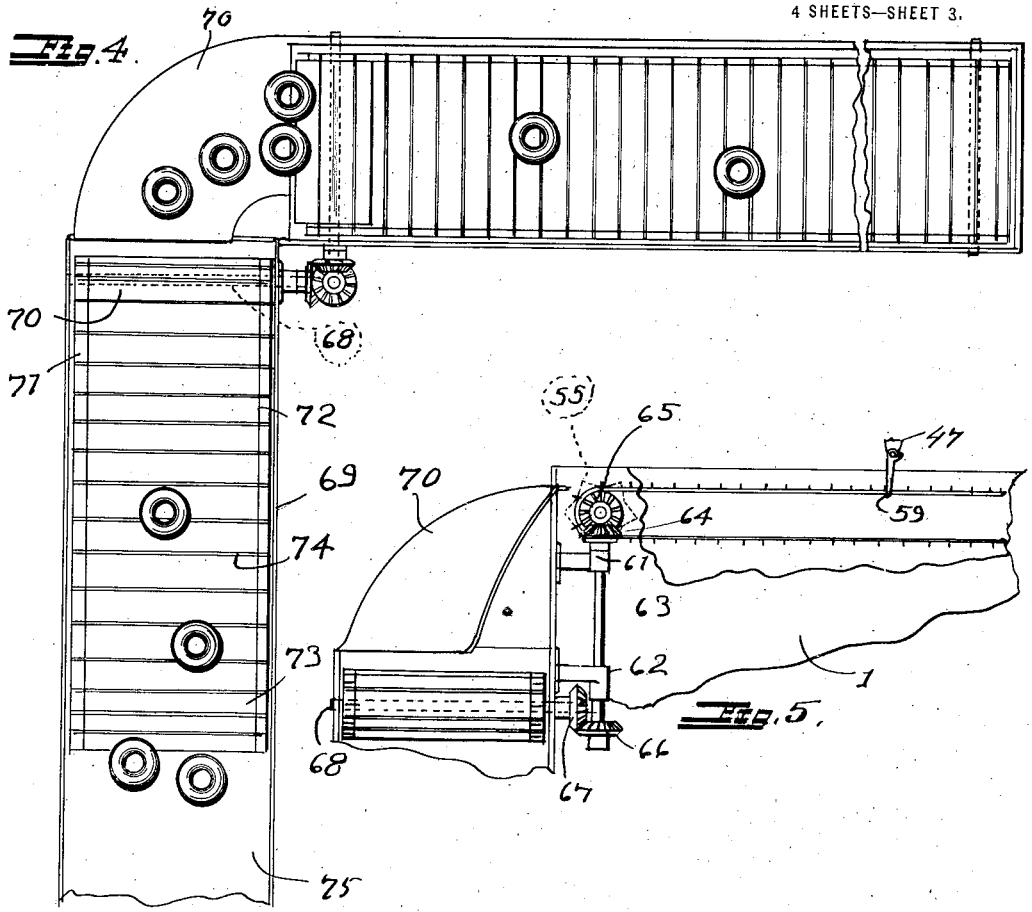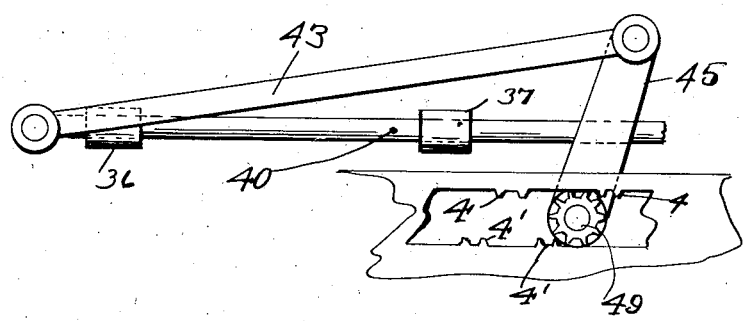

W. F. SCHALLER.
DOUGHNUT FORMING AND COOKING MACHINE.
APPLICATION FILED APR. 20, 1920.
1,391,212.
Patented Sept. 20, 1921.
4 SHEETS—SHEET 4.
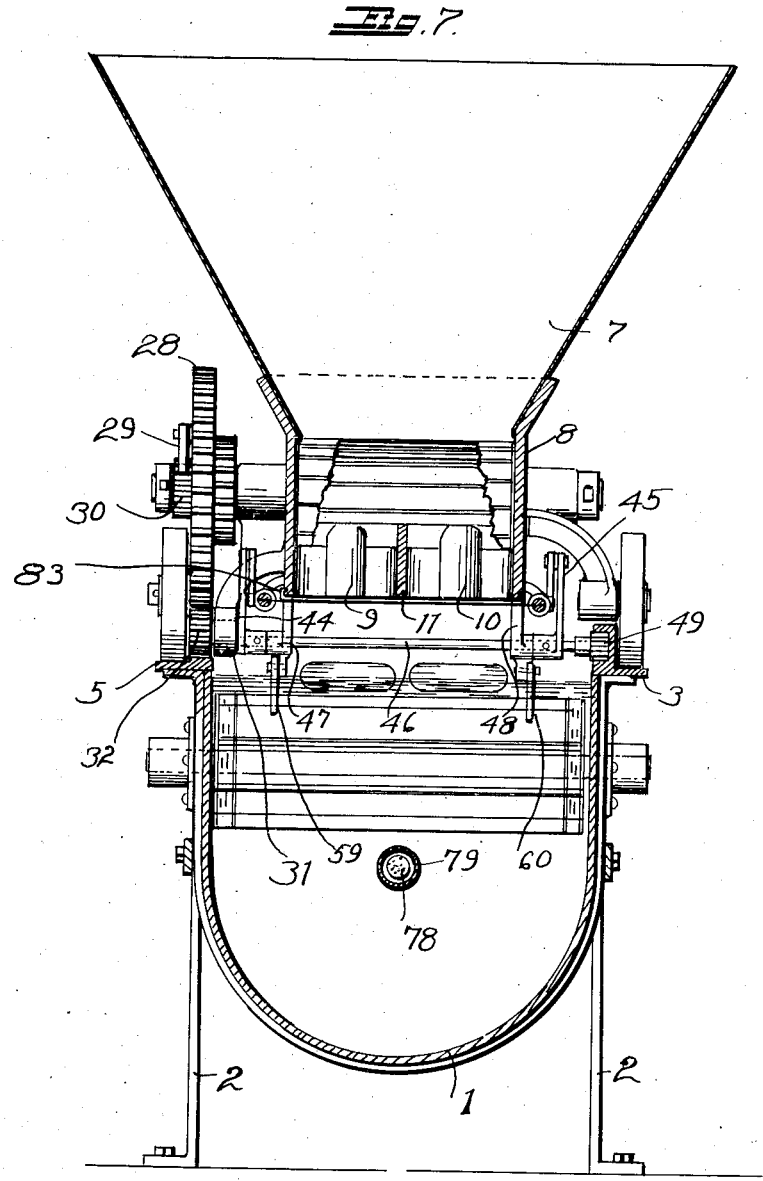
INVENTOR.
W. F. Schaller.
BY
Carlos P. Griffin
ATTORNEY.

UNITED STATES PATENT OFFICE.

WILLIAM F. SCHALLER, OF SAN FRANCISCO, CALIFORNIA.

DOUGHNUT FORMING AND COOKING MACHINE.

1,391,212.  Specification of Letters Patent.  Patented Sept. 20, 1921.

Application filed April 20, 1920. Serial No. 375,385.

*To all whom it may concern:*

Be it known that I, WILLIAM F. SCHALLER, a citizen of the United States, residing at San Francisco, in the county of San Francisco, State of California, have invented a new and useful Doughnut Forming and Cooking Machine, of which the following is a specification in such full and clear terms as will enable those skilled in the art to construct and use the same.

This invention relates to a doughnut forming and cooking machine and its object is to produce a machine which will be capable of making large quantities of doughnuts without manual handling.

The further object of the invention is to produce a machine which will produce a uniform product, the doughnuts being cooked in two operations, first on one side and then on the other.

The further object of the invention is to produce a machine which will partially support the doughnuts during the period of cooking and at the same time gently move them toward the discharge end of the cooking receptacle thereby preventing any of the doughnuts from being allowed to remain in the hot grease to become burned and injure their flavor.

Another object of the invention is to provide a machine which will enable the operator to drop into the cooking receptacle as many doughnuts as he wishes and thereafter to discharge them as soon as the cooking is complete on one side into a second tank where the doughnuts will be turned over while entering the second tank and cooked upon the other side.

Other objects of the invention will appear as the description proceeds.

An embodiment of the invention is shown in the accompanying drawings, in which the same reference numeral is applied to the same portion throughout, but I am aware that there may be modifications thereof.

Fig. 4 is a plan view of the two cooking tanks, showing their relation to each other.

Fig. 5 is a side elevation of one cooking tank and an end elevation of the other cooking tank, showing their difference in elevation.

Fig. 6 is a side elevation of the mechanism for operating the cutter.

Fig. 7 is a transverse sectional view of the dough cutting and dropping machine and its supporting tank.

Figure 1:
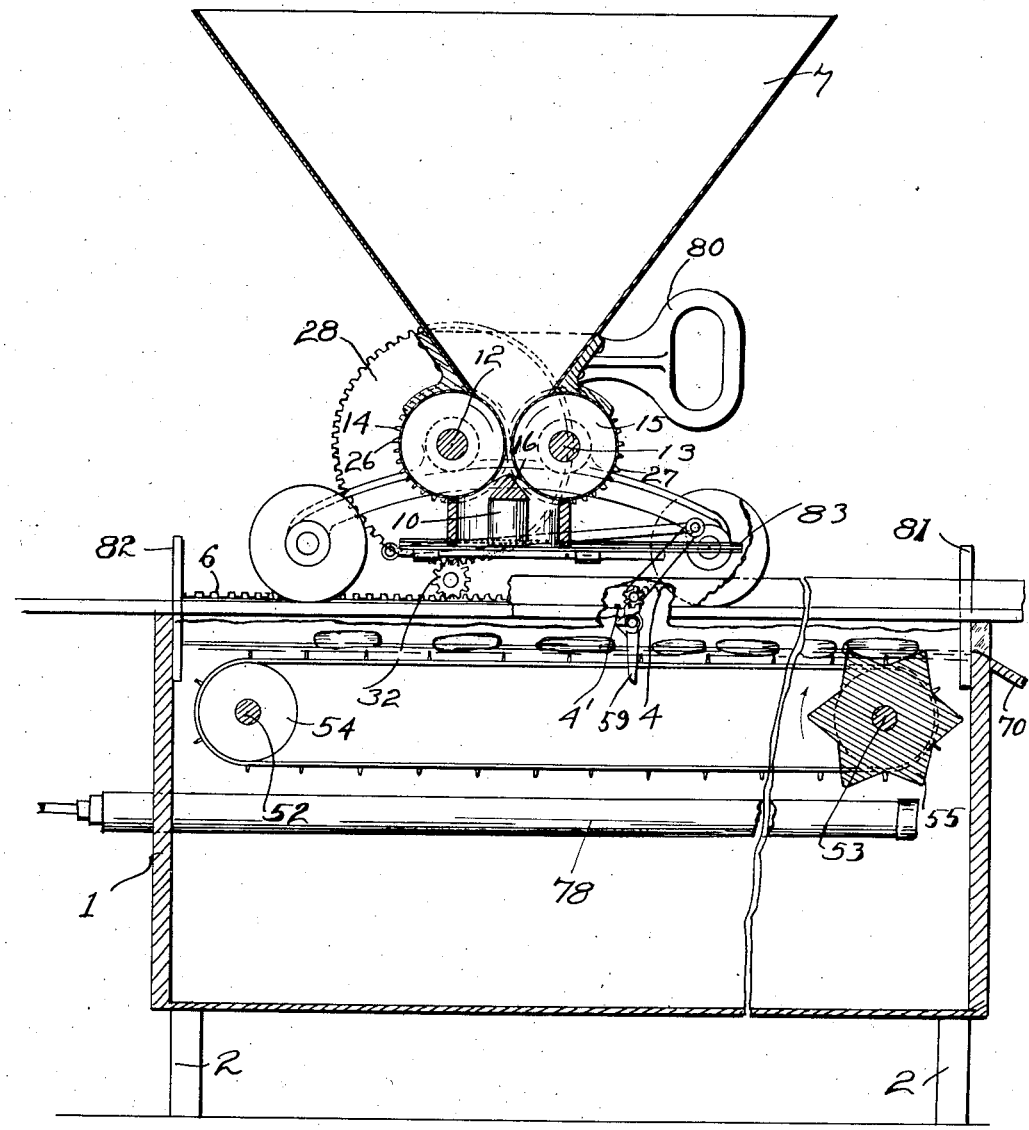
Figure 1 is a vertical sectional view of the complete cutting off machine and one cooking tank.

The numeral 1 indicates the oil receptacle which is supported by suitable legs 2. Extending along the upper edge of the tank 1 is a rail 3 provided with rack teeth and extending along the other edge of the oil receptacle 1 is a rail 5 having rack teeth 6.

The dough receptacle consists of a hopper 7 which connects with a casting 8 in the bottom of which are supported two plugs 9 and 10 and a partition 11 to produce two annular discharge ways for the hopper bottom.

Revolubly mounted in the casting 8 are two shafts 12 and 13 which carry rollers 14 and 15 to force the dough out of the hopper and out of the annular discharge ways, surrounding the plugs 9 and 10, said plugs being separated from the triangular shaped cross bars 16 just below the space between the two rollers 14 and 15.

The casting 8 has four supporting arms 17 to 20 inclusive, which arms are mounted on wheels 21 to 24 inclusive, which wheels ride on the tracks 3 and 5. The two roll shafts are provided with intermeshing gears 26 and 27 so that when one feed roll is driven the other will be driven too, and the shaft 12 carries a driving gear 28, which is loosely mounted thereon, but has a pawl 29 which engages a ratchet wheel 30, so that the feed rolls 14 and 15 will be driven in one direction only.

Depending from the casting 8 is an arm 31 which carries a gear 32 in mesh with the teeth of the rack 6 and in mesh with the teeth of the gear 28. At the sides of the casting 8 there are four arms 34 to 37 inclusive, having bearings at their lower ends for the parallel members 38 and 39 carrying the wire cutter 40. The rods 38 and 39 are connected at one end by means of a cross rod 41 and they are pivotally connected to the two links 42 and 43 and said links are in turn connected to arms 44 and 45 on a shaft 46, journaled in two depending arms 47 and 48.

The shaft 46 has a small gear 49 therein which moves along the track 3 and is engaged first by the teeth 4 on the upper portion of said track to move the arm 45 in one direction and it is thereafter engaged by the teeth 4' on the lower side of the track to reverse the movement of said arm, thereby causing a rapid reciprocation of the wire 40 to the discharge of the dough hopper, the result being that two doughnuts are cut off and dropped into the receptacle with each movement of the arm 45, and the position of the teeth 4 and 4' is suitably arranged to discharge the doughnuts at the proper intervals, in the present instance eight doughnuts are deposited. In order to prevent the dough from dropping down at all times, there is a slide 83, which has its edges upturned to engage grooves in the bottom of the hopper 8, see Fig. 7, which slide is opened when the hopper is moved so the slide engages the posts 81, and closed when the hopper is moved so the slide strikes the posts 82.

The oil heating tank 1 has two shafts 52 and 53 thereon, one of which carries a drum 54 and the other of which carries a fluted drum 55. Endless chains 56 and 57 pass along sprocket wheels at the ends of these drums and said chains are connected by a series of wire rods 58, the object being to partially support the doughnuts and to move them longitudinally of the tank when they are sufficiently cooked.

Depending from the two arms 47 and 48 are two pawls 59 and 60 which have heel pieces to prevent them from being moved to the left Fig. 1, with respect to their supporting pin, but which are free to be moved to the right Fig. 1, to enable the dough hopper to be moved to the left Fig. 1, without altering the position of the endless chains 56 and 57.

At the discharge end of the tank 1, there are two bearings 61 and 62 for the support of a vertical shaft 63, said shaft having a beveled gear 64 at its upper end in mesh with a beveled gear 65 on the end of the shaft 53. At its lower end, the shaft 63 has a beveled gear 66 in mesh with a beveled gear 67 on a shaft 68 extending across the tank 69.

The oil holding tank 1 and the oil holding tank 69 are at right angles to each other and are connected by means of an inclined chute 70 which receives the partially cooked doughnuts from the discharge end of the tank 1, and delivers them to the tank 69, so that they will turn with the top side down as they fall into the latter tank.

The shaft 68 has a drum 70 thereon and endless chains 71 and 72 connect said drum with the feed drum 73 at the opposite end of the tank. Wire rods 74 connect the two chains 71 and 72 to prevent the doughnuts from passing too deep into the hot oil.

The doughnuts are discharged from the tank 69 on a chute 75 from which place they may be taken to any suitable place of storage. Any suitable means may be provided to heat the oil in the receptacles 1 and 69 but I prefer to use the electric heater indicated at 78, a tube 79 being installed lengthwise of the tank for the purpose of inserting the electric heating element.

The operation of the machine is as follows: Assuming a quantity of dough to be placed in the hopper 7, the operator takes hold of the handle 80, which is formed on one end of the casting 8. The entire carriage is then pushed along the tank 1 to the left Fig. 1. The pawls 59 and 60 passing over the wire rods connecting the sprocket chains in the tank without moving them. At the same time the gear 32 is rotated and causes the dough to be fed downwardly from the hopper into the doughnut forming chambers at the bottom of the casting 8 and forced therefrom.

At the same time the dough is passing from the bottom of the casting 8 the gear 49 is being rapidly oscillated and with each movement of the arms 44 and 45, two doughnuts are dropped into the oil tank. When the carriage has been moved to the left hand end of the tank, the operator watches the doughnuts left behind and as soon as the first ones dropped into the tank are cooked, he will start the carriage to move to the right Fig. 1, or to the left Fig. 4, and thereby cause the entire series of doughnuts being cooked to be moved toward the discharge chute 70. The fluted roller 55 causes the doughnuts to be pushed out of the tank. At the same time that the doughnuts are being discharged from the tank 1, the endless carrier in the tank 69 is being operated to cause any doughnuts that may be in that tank to be discharged therefrom. As the doughnuts are pushed on the slide 70 they will drop into the tank 69 and the height of the slide 70 at its end is so arranged—note Fig. 5—that when the doughnuts fall off they are turned over to cook the side that did not cook in the first tank.

Figure 2:
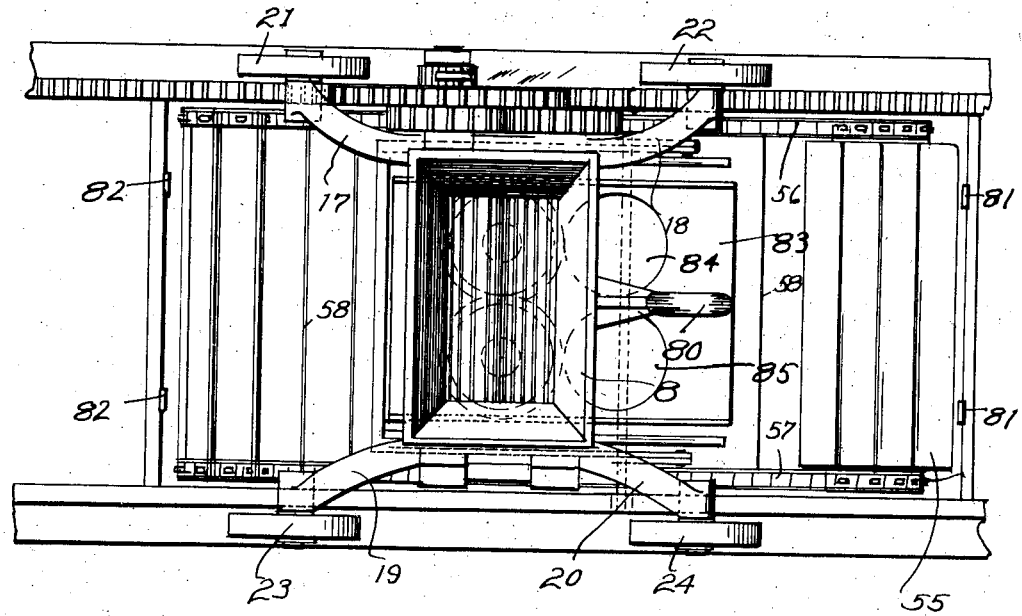
Fig. 2 is a plan view of the cutting off machine and its cooking tank.
Figure 3:
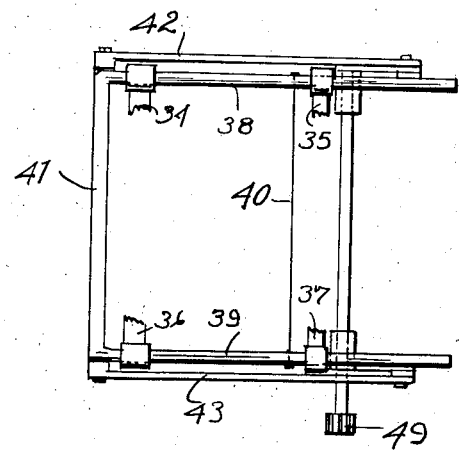
Fig. 3 is a plan view of the cutting off apparatus.

The supporting rails for the carriage extend beyond the ends of the tank 1, but to prevent the carriage from being pushed off of the ends of the rails and to close the slide 83 when the series of doughnuts have been discharged and to open it when a fresh series of doughnuts is to be discharged, the ends of the tank have two posts 82 and two posts 81. The posts 82 close the slide 83, so that the openings 84 and 85 will stand in the position shown in Fig. 2, while the two posts 81 open the slide when a fresh batch of doughnuts is to be dropped into the frying pan.

It will be understood that while the tank 1 has been described as an oil tank, that it is of course intended to use any suitable material in said tank for the frying of the doughnuts, as for example, lard or other cooking oil.

What I claim is as follows, but various modifications may be made in the construction shown in the drawings and above particularly described form, within the purview of my invention.

1. A doughnut forming and cooking machine comprising an oil receptacle, a dough hopper, a carriage movable along the oil receptacle and supporting said dough hopper, means to feed the dough to a die, means to cut off the doughnuts as the dough is forced through the die and as the carriage is moved along the oil receptacle and a movable slide to prevent the discharge of any dough from the receptacle.

2. A doughnut forming and cooking machine comprising an oil receptacle, a carriage movable along the same, a dough hopper, means to form and cut off the doughnuts intermittently as the carriage is pushed along the oil receptacle, an endless conveyer in the oil receptacle and means connected with the carriage for moving the endless conveyer to discharge the doughnuts from the oil receptacle.

3. A doughnut forming and cooking machine comprising an oil receptacle, a carriage movable along the same, means to form and cut off a series of doughnuts as the carriage is moved along the oil receptacle, a hopper supported by the carriage for carrying the dough supply, an endless conveyer in the oil receptacle and a pawl carried by the carriage for moving the conveyer in one direction only.

4. A doughnut forming and cooking machine comprising an oil receptacle, a carriage movable along the same, means to form and cut off a series of doughnuts as the carriage is moved along the oil receptacle, a hopper supported by the carriage for carrying the dough supply, an endless conveyer in the oil receptacle, a pawl carried by the carriage for moving the conveyer in one direction only, a second oil receptacle and means between the two oil receptacles to turn the doughnuts over before passing into the second oil receptacle.

5. A doughnut forming and cooking machine comprising an oil receptacle, a carriage movable along the same, a dough hopper, a die, means to force the dough from the hopper through the die, means to intermittently cut off the dough to form the doughnuts as the carriage is moved along the oil receptacle, means operated by the movement of the hopper to discharge the doughnuts from the oil receptacle, a second oil receptacle, a chute connecting the first oil receptacle and the second oil receptacle and arranged to invert the doughnuts as they fall into the second receptacle.

In testimony whereof I have hereunto set my hand this day of April, A. D. 1920.

WILLIAM F. SCHALLER.